United States Patent [19]

Coville

[11] Patent Number: 4,858,174

[45] Date of Patent: Aug. 15, 1989

[54] ELECTRONIC POSTAGE METER CONTROL SYSTEM EMPLOYING A MEMBRANE SWITCH MECHANISM

[75] Inventor: William W. Coville, Stamford, Conn.

[73] Assignee: Pitney Bowes Inc., Stamford, Conn.

[21] Appl. No.: 455,164

[22] Filed: Jan. 3, 1983

[51] Int. Cl.[4] ........................ G06F 3/02; H01H 13/74; G07G 1/00

[52] U.S. Cl. ................................ 364/900; 364/464.02

[58] Field of Search ........................................ 200/159; 364/200 MS File, 900 MS File, 464.02

[56] References Cited

U.S. PATENT DOCUMENTS

| | | | |
|---|---|---|---|
| 3,798,394 | 3/1974 | Stokes | 200/159 B |
| 3,854,018 | 12/1974 | Reynolds et al. | 200/159 B |
| 3,938,095 | 2/1976 | Check, Jr. et al. | 340/172.5 |
| 3,965,851 | 6/1976 | Cohn | 118/1 |
| 3,978,457 | 8/1976 | Check, Jr. et al. | 340/172.5 |
| 4,050,374 | 9/1977 | Check, Jr. | 101/91 |
| 4,090,063 | 5/1978 | Martin | 235/92 |
| 4,246,643 | 1/1981 | Hubbard | 364/900 |
| 4,270,171 | 5/1981 | Maples et al. | 364/480 |
| 4,313,105 | 1/1982 | Anantham et al. | 340/825.56 |
| 4,322,588 | 3/1982 | Chumley et al. | 200/5 A |
| 4,336,529 | 6/1982 | Buan | 340/365 |
| 4,365,536 | 12/1982 | Koepke et al. | 84/433 |
| 4,438,301 | 3/1984 | Van Zeeland | 200/16 C |
| 4,456,800 | 6/1984 | Holland | 200/5 A |
| 4,506,118 | 3/1985 | Mollman | 200/1 R |
| 4,519,048 | 5/1985 | Abellana et al. | 364/900 |

FOREIGN PATENT DOCUMENTS

| | | | |
|---|---|---|---|
| 2500701 | 11/1974 | Fed. Rep. of Germany | 200/159 B |

*Primary Examiner*—Gary V. Harkcom
*Assistant Examiner*—Christopher H. Lynt
*Attorney, Agent, or Firm*—Charles G. Parks, Jr.; David E. Pitchenik; Melvin J. Scolnick

[57] ABSTRACT

An electronic postage meter employs a membrane switch mechanism. The postage meter is of the type having a mechanism for printing postage and accounting circuits for accounting for postage printed by the printing mechanism. A membrane switch is coupled between the printing mechanism and accounting circuits to provide print wheel setting information to the accounting circuits. The membrane switch mechanism may in one embodiment include a plurality of switch contacts and a plurality of switch contact actuating structures to activate different ones of the switch contacts. The membrane switch is mounted such that different ones of the plurality of the actuating structure activates a predetermined one of the plurality of switch contacts depending upon the position of the print wheels.

8 Claims, 2 Drawing Sheets

ELECTRONIC POSTAGE METER CONTROL SYSTEM EMPLOYING A MEMBRANE SWITCH MECHANISM

FIELD OF THE INVENTION

The present invention relates to electronic postage meter control systems and more particularly to electronic postage meter print control systems employing membrane switch mechanisms.

BACKGROUND OF THE INVENTION

Electronic postage meters have been developed with electronic accounting circuitry. Postage meter systems of this type are disclosed in: U.S. Pat. Nos. 3,978,457 for MICROCOMPUTERIZED ELECTRONIC POSTAGE METER SYSTEM; and in 3,938,095 for COMPUTER RESPONSIVE POSTAGE METER. The electronic accounting circuits include memory capability for storing postage accounting information. The memory function in the electronic accounting circuits have replaced the function served in postage meters by mechanical accounting registers.

Postage meters with mechanical accounting registers are not subject to many of the problems encountered by electronic postage meters. Conditions cannot normally occur in postage meters with mechanical registers that prevent accounting for a printing cycle or which result in the loss of data stored in the registers. In mechanical meters the printing mechanism is directly mechanically linked to the accounting wheels. Consequently, the printing and accounting functions are mechanically linked so that accounting occurs simultaneously with printing. Also, because of the direct linkage, the information regarding setting of the print wheels is directly coupled to the accounting registers. This is not the case in electronic postage meters where the printing is most often a mechanical function and the accounting is an electronic function. Thus, dependent reliable control of the postage printing mechanism operation including communicating setting information to the accounting circuits is critical to the proper operation of electronic postage meters. Communications is of extreme importance because of the need to reliably and accurately provide print wheel getting information to the accounting circuits so that an accurate account can be maintained of printed postage.

Postage meter printing systems suitable for use with electronic postage meters, such as disclosed in U.S. Pat. Nos. 3,965,851 for SETTING MECHANISM FOR A POSTAGE PRINTING DEVICE and 4,050,374 for METER SETTING MECHANISM, include a printing drum with a set of adjacent print wheels each of which print characters. Each print wheel is set for example to position different postage amounts for printing, by an independently rotatable gear mechanism adapted to be engaged by a master gear. The master gear is rotatably mounted within a laterally moveable carriage. The carriage can be moved to cause successive engagement with each independently rotatable gear mechanism. The printing drum is engaged to rotate to print postage by a drive gear within the meter. Other types of postage meters include bed and platen design and miniature hand held machines. In all types of postage meters it is essential that the sums recorded by the meter be the same as those printed on letters or labels.

Several methods have been used to solve the problem of locating the position of print wheels in postage meters and in other devices. The systems disclosed in U.S. Pat. Nos. 3,978,457 for MICROCOMPUTERIZED POSTAGE METER SYSTEM and 4,050,374 for METER SETTING MECHANISM employ electro-optical techniques. The system disclosed in U.S. Pat. No. 4,313,105 for ENCODING SWITCHES uses a concentric electrical contacts in conjunction with a special code. The system disclosed in U.S. Pat. No. 4,090,063 for FRANKING MACHINE COMPRISING AN ELECTRONIC COUNTERING SYSTEM uses a flexible contact brush in conjunction with a row of conductive strips. The system disclosed in U.S. Pat. No. 4,246,643 for LOW COST POSTAGE APPLICATOR employs encoder discs having patterns of conductive metals sensed with a conductive wiper.

Those of the above methods employed in systems involving postage meters achieve their intended purpose. However, the electro-optical devices require light sources which are subject to burn out. The encoders which use wipers or brushes are subject to environmental conditions including moisture and dirt. Also, these sensors can serve as sources of electromagnetic interference which can introduce unwanted signals to electronic accounting circuitry.

SUMMARY OF THE INVENTION

It has been discovered that increased advantages could be obtained in locating the position of the print wheels by using membrane switch material of the type disclosed in U.S. Pat. No. 4,307,275 for MEMBRANE SWITCH

CONSTRUCTION AND METHOD FOR MAKING SAME

It has also been found that by using switch contacts made of membrane switch material, sensing of print wheels can be located near or on the print wheels rather than deep inside the postage meter. This is particularly desirable since, due to the function print wheels perform, that is, the printing of postage on an envelope or tape, it is not possible to incorporate print wheels into the main shielding of the meter which protects sensitive components inside the postage meter. However, it has been shown in U.S. Pat. No. 4,336,529 for POSTAGE METER HAVING SHIELDED KEYBOARD TO PROTECT AGAINST ELECTROMAGNETIC RADIATION that membrane switch material can be constructed in such a manner that shielding can be built into the material itself. It has been discovered that this feature can be usefully employed in accordance with the printing function of the meter. Moreover, membrane switch material can also be hermetically sealed, thus reducing a substantial amount of the problems associated with the machine environment.

It has further been discovered that improved alignment of the print wheel sensing mechanism be obtained, using less time with these lower cost parts.

The present invention has application for use with other postage meter functions. For example, the membrane switch can be bonded inside a postage meter printing drum to sense printing or the mechanical accounting wheels of a mechanical postage meter to provide accounting information to electronic components such as displays or remote accounting and monitoring systems.

In accordance with the present invention, a postage meter is provided of the type having means for printing postage. The printing means is moveable between a plurality of positions to print a plurality of postage values. Means are provided for accounting for postage printed by said printing means. A switch means is coupled between the printing means and the accounting means for providing information between the printing means and the accounting means of the position of the printing means. The switch means comprises a membrane switch mechanism having a plurality of switch contacts and a plurality of means for activating different ones of said switch contacts. The switch means is mounted such that different ones of said plurality of said actuating means activates predetermined ones of said plurality switch contacts depending upon the position of the printing means.

DESCRIPTION OF THE DRAWINGS

The structure and operation of invention will be better understood and will become more apparent with reference to the following detailed description taken in conjunction with the accompanying drawings in which like reference numerals designate similar elements in the various figures, and in which.

DETAILED DESCRIPTION OF THE PREFERRED EMBODIMENTS

Generally, the invention is particularly useful for a setting mechanism for a postage printing device having a plurality of wheels which are individually settable to provide a composite postage value. The meter may employ a plurality of individual moveable print wheel driving racks, each print wheel driving rack moveably operable to set a corresponding print wheel.

The setting mechanism may include a driving mechanism operatively engageable with each of the print wheel driving racks for the purpose of setting the print wheels. The driving mechanism is operative to individually engage each of the print wheel driving racks and individually drive them such that the print wheel driving racks are moveably driven in sequence. Setting mechanisms are operatively connected to the driving mechanism for causing the driving mechanism to individually engage each of the print wheel driving racks in a sequential fashion. The driving mechanism can be hand cranked or motor driven. The driving mechanism moveable drives each of the print wheel driving racks upon operative engagement with the setting mechanism. A detailed description of mechanisms of this type are disclosed in the above-noted U.S. patents.

Figure 1:
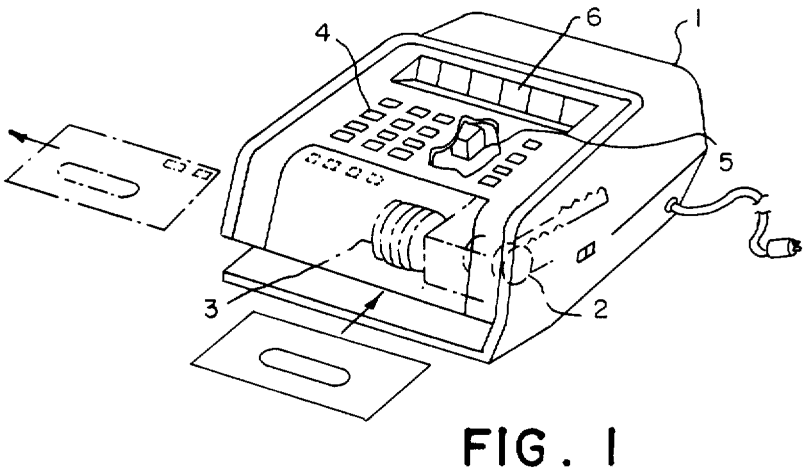
FIG. 1 is a perspective view of a bed and platen type postage meter suitable for use with the present invention.
Figure 2:
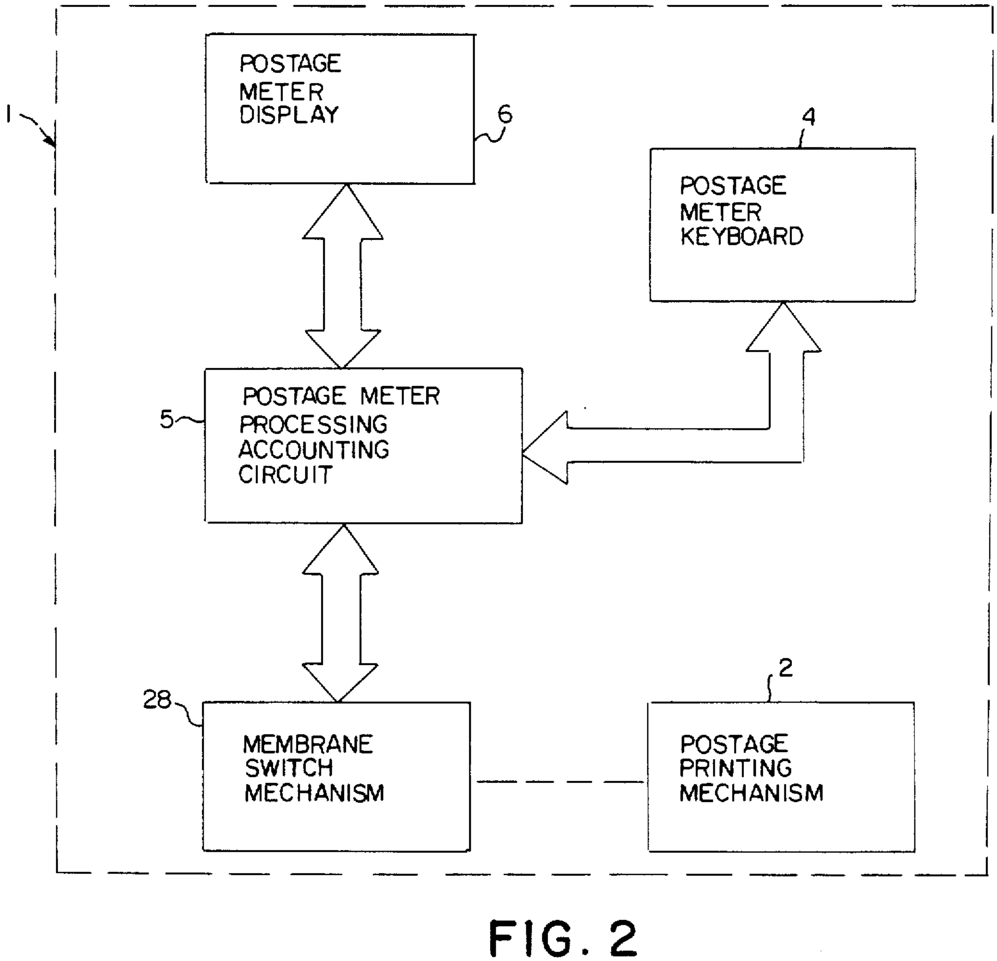
FIG. 2 is a block diagram showing the main interconnections of an electronic postage meter embodying the present invention.

Referring now to FIGS. 1 and 2. A bed and platen postage meter 1 contains a printing mechanism 2 which includes moveable print wheels 3. Under normal operation, a desired amount of postage to be printed is entered on keyboard 4. If there is sufficient postage in the accounting circuits 5 after the print wheels 3 are set to the selected amount, the mechanism is operated to print postage. However, prior to printing, the accounting circuits 5 may check the position of the print wheels 3, to determine if they match the selected postage amount entered on the keyboard 4 and displayed in display 6. If the print wheel setting does not match the selected postage amount entered via the keyboard, postage meter 1, may be disabled from further operation. The print wheel setting corresponds to the selected postage amount, the printing mechanism 2 is enabled and printing of postage takes place on a mail piece. Thus, before each postage printing cycle, the position of the print wheels 3 is sensed and compared with the selected postage amount. This sensing is accomplished by using a plurality of switch contacts contained in membrane print wheel switch mechanism 28.

Figure 3:
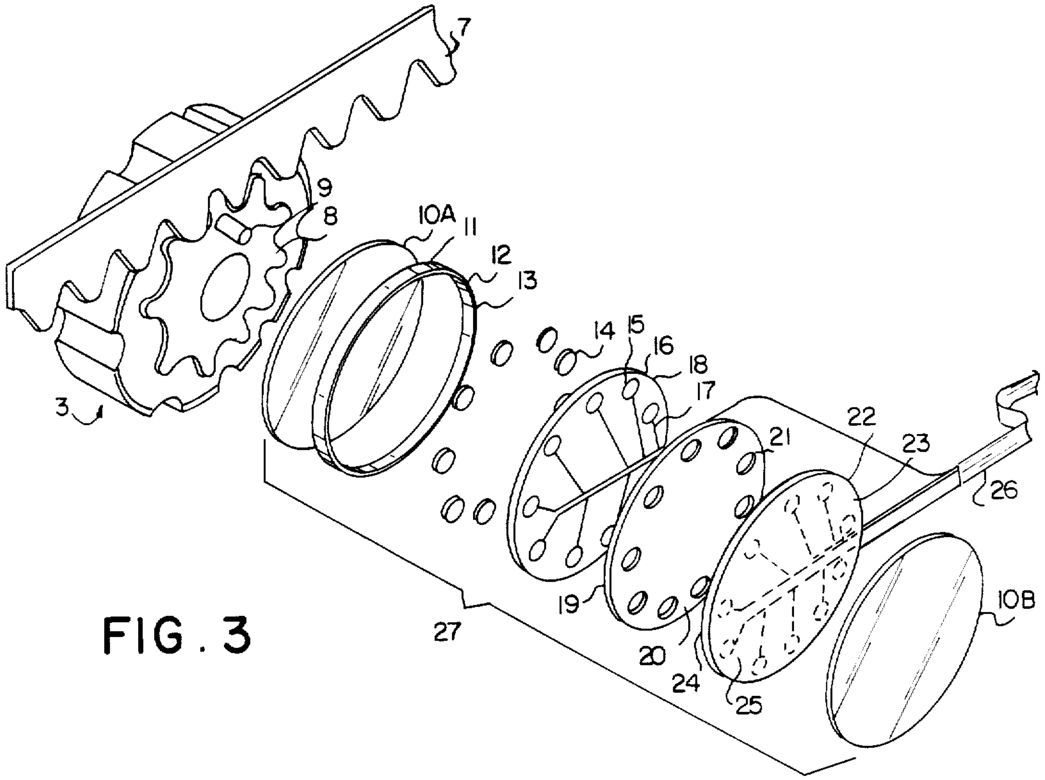
FIG. 3 is a perspective view of a printing mechanism for a postage meter showing a membrane encoder attached to one of the postage meter print wheels.

A more thorough understanding of a membrane print wheel switch mechanism 28 can be obtained by referring now to FIG. 3. A notched rack 7 is attached to the meter setting device (not shown). The rack 7 drives gear 8 which is attached to the print wheel 3. Attached to the gear 8, which is part of the print wheel 3 is, the switch actuator pin 9.

The membrane switch mechanism itself included flexible metal end cover discs 10A and 10B which shield the switch from electromagnetic radiation. The discs operate in conjunction with a metal spacer ring 12. Spacer ring 12 is held to the metal cover disc 10A by adhesive layer 11. Individual non-conductive actuator buttons 14 are secured in place by actuator button sockets 15 which are molded into the common insulated circuit board 16. A conductive flexible circuit board 17 is attached to the insulated circuit board 16 by adhesive bonding layer 18. An adhesive layer 13 is applied to the spacer ring 12 and spacer ring 12 is attached to the insulated circuit board 16 with the actuator buttons 14 seated in their sockets 15. Another adhesive layer 19 is applied between the non-conducting areas of the circuit board 17 and an apertured insulating spacer disc 20. A flexible conductive circuit board 22 is attached to the apertured insulated spacer disc 20 by an adhesive layer 21. The other side of the flexible conductive circuit board 22 is attached to a rigid insulated circuit board 23 by adhesive layer 24. Metal end cover 10B is attached to the rigid insulated circuit board 23 by adhesive layer 25. When assembled the membrane print wheel switch mechanism 27 receives and sends signals to and from the accounting circuits 5 using a flexible shielded cable 26.

In operation, power is applied to postage meter 1. The display 6 becomes activated. The postage meter accounting circuit 5 checks that membrane switch mechanism 27 is at home or zero position, if not the meter 1 will become disabled. Sensing is accomplished when there is a complete circuit between flexible circuit board 17 and flexible circuit board 22. Flexible circuit board 17 is brought into contact with flexible circuit board 22 by actuator pin 9 pressing against shielded metal cover 10A causing a actuator button 14 to bring flexible circuit boards 17 and 22 in contact through openings in the insulated spacer 20.

On receiving the proper signals from the accounting circuit 5, the driving mechanism moves rack 7 causing gear 8 attached to print wheel 3 to move actuator pin 9 to a new position in the membrane switch mechanism 27. The new position is sensed in the same manner as described above before printing can take place.

In this manner, the mechanical position of the print wheel is verified corresponding to the electrical position required by selected postage value entered via the keyboard.

Figure 4:
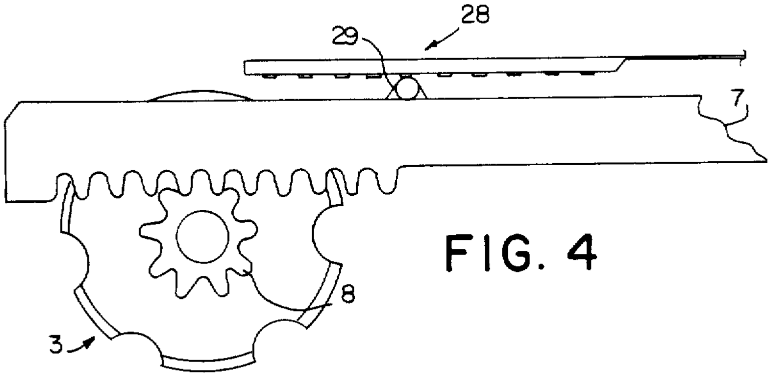
FIG. 4 is a side view of a printing mechanism for a postage meter showing a linear bank of membrane switches attached to a postage meter print wheel rack.

FIG. 4 is an alternate embodiment of the present invention employing a linear membrane switch mechanism 28. In this embodiment, the linear membrane switch mechanism is actuated by a roller 29 fixed to rack 7 which is locked to the print wheel gear 8. The membrane switch 28 may be constructed with similar layers as the membrane switch described in FIG. 3.

It should also be noted that membrane switch mechanisms could be used in other parts of a postage meter such as the ascending and descended mechanical counters which are mechanically linked. The use of these switches would provide an electrical readout of those otherwise mechanical devices.

What is claimed is:

1. In a postage meter of the type having means for printing postage, the printing means movable between plurality of positions to print plurality of postage value, and means for accounting for postage printed by the printing means, the improvement comprising:

an actuating member coupled to the printing means;

switch means coupled to the actuating member between the printing means and the accounting means for providing information between the printing means and the accounting means of the position of the printing means;

the switch means comprising a membrane switch;

the membrane switch further comprising a shielding means coupled to the actuating member, circuit means which is attachably connected to and insulated from the shielding means, the circuit means having a plurality of switch contacts and a plurality of means for activating different ones of the switch contacts; and the switch means mounted such that different ones of the plurality of the activating means activates predetermined ones of the plurality of switch contacts depending upon the position of the actuating member of the printing means.

2. A postage meter as defined in claim 1 wherein the shielding means includes a first metal disc, a metal spacing member connected to the first metal disc, and a second metal disc connected to the metal spacing member at a side opposite the first disc.

3. A postage meter as defined in claim 2 wherein the circuit means is a first and second flexible circuit board.

4. A postage meter as defined in claim 2 where the printing means includes a rotary member and the membrane switch mechanism is mounted on the printing means rotary member.

5. A postage meter as defined in claim 4 wherein the plurality of activating means are positioned along a circular path and are selectively engaged by the rotary member of the printing means.

6. A postage meter as defined in claim 2 wherein the printing means includes a linearly movable member and the plurality of activating means are positioned along a linear path.

7. A postage meter as defined in claim 1 where the membrane switch member is the type comprising two printed circuit boards each with switch segment patterns and an apertured spacer means spacing said printed circuit board switch segments, each of said printed circuit switch segment pattern being one contract of said plurality of switch contacts.

8. A postage meter as defined in claim 7 where the actuating means is positioned to cause said printed circuit contacts of said printed circuit board to move relative to one another to cause the contacts to project the aperture of said spacer means to be closed.

* * * * *